(12) United States Patent
Kawamura et al.

(10) Patent No.: US 8,526,511 B2
(45) Date of Patent: Sep. 3, 2013

(54) BASE STATION, MOBILE STATION AND METHOD

(75) Inventors: Teruo Kawamura, Yokosuka (JP); Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 743 days.

(21) Appl. No.: 12/293,627

(22) PCT Filed: Mar. 19, 2007

(86) PCT No.: PCT/JP2007/055578
§ 371 (c)(1),
(2), (4) Date: Jun. 22, 2010

(87) PCT Pub. No.: WO2007/111187
PCT Pub. Date: Oct. 4, 2007

(65) Prior Publication Data
US 2010/0290544 A1    Nov. 18, 2010

(30) Foreign Application Priority Data
Mar. 20, 2006  (JP) .................................. 2006-077822

(51) Int. Cl.
*H04L 27/00* (2006.01)

(52) U.S. Cl.
USPC .......................................... 375/259; 375/350

(58) Field of Classification Search
USPC .................. 375/259, 219–222, 356–358, 350
See application file for complete search history.

(56) References Cited

U.S. PATENT DOCUMENTS

| | | | |
|---|---|---|---|
| 7,107,021 B2 * | 9/2006 | Kim et al. ...................... | 455/101 |
| 2002/0154620 A1 * | 10/2002 | Azenkot et al. ............... | 370/347 |
| 2003/0125040 A1 * | 7/2003 | Walton et al. ................. | 455/454 |
| 2003/0215029 A1 * | 11/2003 | Limberg ....................... | 375/321 |
| 2004/0022176 A1 * | 2/2004 | Hashimoto et al. ........... | 370/204 |
| 2004/0038693 A1 | 2/2004 | Niwano | |
| 2006/0264180 A1 * | 11/2006 | Qiu ................................ | 455/69 |
| 2007/0195740 A1 * | 8/2007 | Bhushan et al. .............. | 370/335 |
| 2007/0218942 A1 * | 9/2007 | Khan et al. ................. | 455/553.1 |

FOREIGN PATENT DOCUMENTS

| | | |
|---|---|---|
| JP | 2001-189763 A | 7/2001 |
| JP | 2005-318533 A | 11/2005 |
| JP | 2006-067236 A | 3/2006 |
| WO | 03/015443 A1 | 2/2003 |

OTHER PUBLICATIONS

International Search Report w/translation from PCT/JP2007/055578 dated Jul. 3, 2007 (5 pages).

(Continued)

*Primary Examiner* — Emmanuel Bayard
(74) *Attorney, Agent, or Firm* — Osha Liang LLP

(57) ABSTRACT

A single carrier scheme is used in an uplink in the mobile communication system. A base station used in the mobile communication system includes: means configured to perform communication with a mobile station that uses the whole or a part of a system frequency band; storage means configured to store correspondence relationship between radio parameters including a bandwidth, a modulation scheme and a channel coding rate of the uplink and filter parameters including at least a roll-off factor of a band limitation filter; and determination means configured to determine radio parameters and filter parameters for each mobile station based on the correspondence relationship according to channel state of the uplink. The radio parameters and the filter parameters determined in the determination means are reported to the mobile station.

10 Claims, 5 Drawing Sheets

(56) References Cited

OTHER PUBLICATIONS

Written Opinion from PCT/JP2007/055578 dated Jul. 3, 2007 (3 pages).
3GPP TS 25.101 v3.18.0, "3rd Generation Partnership Project; Technical Specification Group Radio Access Networks; User Equipment (UE) radio transmission and reception (FDD)"; Release 1999; Sep. 2005 (69 pages).
Office Action for European Application No. 07739021.9 dated Oct. 26, 2012 (9 pages).
3GPP TR 25.814 V1.1.1; "3rd Generation Partnership Project; Technical Specification Group Radio Access Network; Physical Layer Aspects for Evolved UTRA," (Release 7) (Feb. 2006) (84 pages).

* cited by examiner

FIG.4

| | MCS NUMBER | DATA MODULATION | CHANNEL CODING RATE | RELATIVE INFORMATION BIT RATE |
|---|---|---|---|---|
| BAD ↑ | MCS1 | QPSK | 1/3 | 1 |
| | MCS2 | QPSK | 1/2 | 1.5 |
| | MCS3 | QPSK | 2/3 | 2 |
| | MCS4 | QPSK | 6/7 | 2.57 |
| CQI | MCS5 | 16QAM | 1/2 | 3 |
| | MCS6 | 16QAM | 2/3 | 4 |
| | MCS7 | 16QAM | 3/4 | 4.5 |
| | MCS8 | 16QAM | 5/6 | 5 |
| ↓ | MCS9 | 16QAM | 6/7 | 5.24 |
| GOOD | MCS10 | 16QAM | 8/9 | 5.33 |

FIG.5

| TRANSMISSION BANDWIDTH | MCS | (ROLL-OFF FACTOR, SUBCARRIER) |
|---|---|---|
| $BW_1$ | MCS1 | $(\alpha_1, N_1)$ |
| | MCS2 | $(\alpha_2, N_2)$ |
| | MCS3 | $(\alpha_3, N_3)$ |
| $BW_2$ | MCS1 | $(\alpha_4, N_4)$ |
| | MCS2 | $(\alpha_5, N_5)$ |
| | MCS3 | $(\alpha_6, N_6)$ |

BASE STATION, MOBILE STATION AND METHOD

TECHNICAL FIELD

The present invention relates to a base station, a mobile station and a method used in a mobile communication system.

BACKGROUND ART

In a next generation radio access scheme for which research and development are currently being conducted, it is required to perform communication more efficiently compared with conventional schemes. In the downlink, speed-up and increase of capacity for communication are especially required. Thus, radio access schemes of a multicarrier scheme such as orthogonal frequency division multiplexing (OFDM) are highly expected. On the other hand, the uplink is different from the downlink in that speed-up and large capacity are not so strongly required for the uplink as the downlink and that transmission power of a mobile station is considerably limited compared with that of the base station and the like. Thus, the multicarrier scheme in which there is a fear that peak to average power ratio (PAPR) becomes large is not a proper scheme for the uplink. Rather, from the viewpoint of suppressing PAPR and increasing coverage of a cell, it is desirable to adopt a single carrier scheme for the uplink.

By the way, in the next generation radio access scheme, wide range of system frequency band is prepared, and it is predicted that mobile stations perform communication using the whole or a part of the band. In view of properly suppressing PAPR in various uplink bands and decreasing effects exerted on adjacent bands, it is necessary to properly perform band limitation (that is also called wave shaping or spectrum shaping).

However, in conventional radio access schemes, the system frequency band is fixed to 5 MHz, for example, and the band limitation scheme is also fixed. If the conventional technique is used for the next generation radio access scheme, there is a fear that system capacity is restricted due to the fact that proper wave shaping is not performed.

By the way, a non-patent document 1, for example, discloses that chip data sequence after code spreading is band-limited to a band of 5 MHz by a raised cosine root Nyquist filter (roll-off factor is 0.22).
[Non-patent document 1] 3GPP, TS25.101, "User Equipment (UE) radio transmission and reception (FDD)"

DISCLOSURE OF THE INVENTION

Problem to be Solved by the Invention

An object of the present invention is to provide a base station, a mobile station and a method for improving system capacity in uplink radio access of a single carrier scheme.

Means for Solving the Problem

In the present invention, a base station in a mobile communication system using a single carrier scheme in an uplink is used. The base station includes: means configured to perform communication with a mobile station that uses the whole or a part of a system frequency band; storage means configured to store correspondence relationship between radio parameters including a bandwidth, a modulation scheme and a channel coding rate of the uplink and filter parameters including at least a roll-off factor of a band limitation filter; and determination means configured to determine radio parameters and filter parameters for each mobile station based on the correspondence relationship according to channel state of the uplink. The radio parameters and the filter parameters determined in the determination means are reported to the mobile station.

Effect of the Invention

According to the present invention, system capacity in an uplink radio access of the single carrier scheme can be improved.

BRIEF DESCRIPTION OF THE DRAWINGS

FIG. 4 is a diagram showing combination examples of modulation schemes and channel coding rates;
FIG. 5 is a diagram showing a table defining correspondence relationships between radio parameters and filter parameters.

DESCRIPTION OF REFERENCE SIGNS

UE mobile station
BS base station
α roll-off factor

PREFERRED EMBODIMENTS FOR CARRYING OUT THE INVENTION

According to an embodiment of the present invention, a base station stores correspondence relationship between radio parameters including a bandwidth, a modulation scheme and a channel coding rate of an uplink and filter parameters including at least a roll-off factor of a band limitation filter. Radio parameters and filter parameters are determined for each mobile station based on the correspondence relationship according to channel state of the uplink, and they are transmitted to a mobile station. Accordingly, radio parameters and filter parameters suitable for actual channel state are reported to the mobile station, so that transmission efficiency of the uplink improves and system capacity can be increased.

The correspondence relationship may associate a radio parameter of a higher bit rate with a smaller roll-off factor, and may associate a radio parameter of a lower bit rate with a larger roll-off factor.

The correspondence relationship may associate a wider bandwidth with a larger roll-off factor, and may associate a narrower bandwidth with a smaller roll-off factor.

In a case when assignment content of radio resources of the uplink is updated, when both or one of the modulation scheme and the channel coding rate is changed, a center frequency of the bandwidth may be kept unchanged. In this case, the bandwidth may be changed. This is desirable from the viewpoint of simplifying filter adjustment.

In a case when assignment content of radio resources of the uplink is changed, when both or one of the modulation scheme and the channel coding rate is changed, change of a center frequency of the bandwidth may be permitted. In this case, the bandwidth may be changed. This is desirable from the viewpoint of further increasing transmission efficiency and improving system capacity.

Embodiment 1

Figure 1:
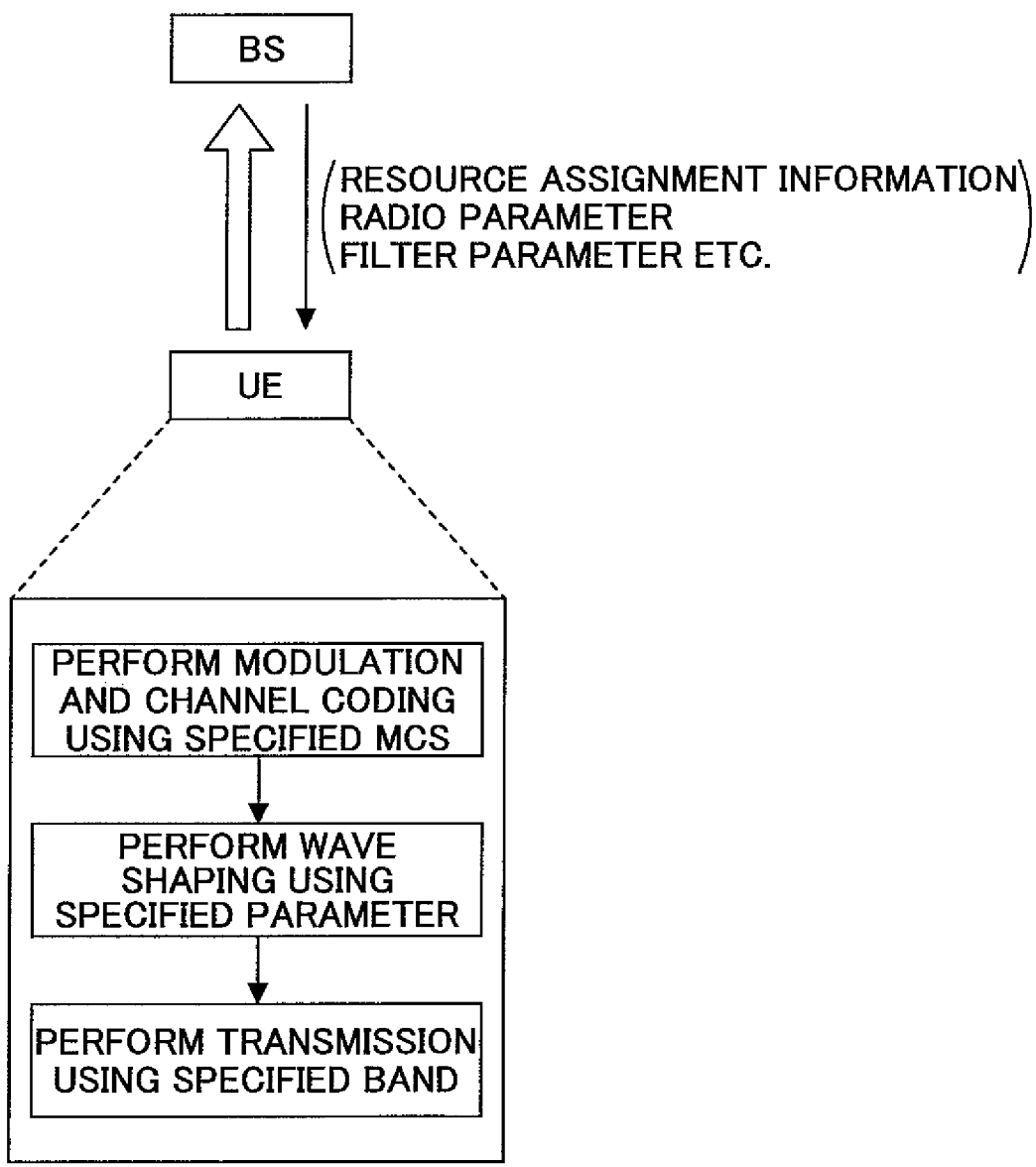
FIG. 1 is a diagram showing a mobile communication system according to an embodiment of the present invention.

FIG. 1 shows a mobile communication system according to an embodiment of the present invention. FIG. 1 shows a base station BS and a mobile station or a user apparatus UE. In the present embodiment, the single carrier scheme is adopted in the uplink so that PAPR is effectively suppressed. The mobile station performs communication using the whole or a part of the system frequency band. For example, in a system frequency band of 20 MHz, the mobile station performs communication using a band of 1.25 MHz, 5 MHz, 10 MHz or the like. In addition, for improving radio transmission efficiency, adaptive modulation and channel coding (AMC) control is performed so that the modulation scheme and the channel coding rate are adaptively changed according to channel states.

The base station determines radio parameters including a bandwidth, a modulation scheme and a channel coding rate used by the mobile station according to the channel state of the uplink. Determination of the radio parameters is performed by a scheduler that determines radio resources to be assigned to each mobile station (performs scheduling). In the present embodiment, the base station determines not only radio parameters used by the mobile station in the uplink but also filter parameters including a roll-off factor and a pass band of the roll-off filter that performs band limitation. Radio resource assignment content, radio parameters and filter parameters determined in the base station are reported to the mobile station by a control channel. The mobile station receives the control channel and identifies the radio parameters and the filter parameter. The mobile station performs data modulation and channel coding for a signal to be transmitted according to the reported radio parameter. The mobile station performs wave shaping (band limitation) on the signal after being modulated and channel-coded. The band limitation is performed according to the reported filter parameters. The signal on which band limitation has been performed is transmitted to the base station using a bandwidth specified by the radio parameter.

Next, relationship between the radio parameters and the filter parameters is described.

Figure 2:
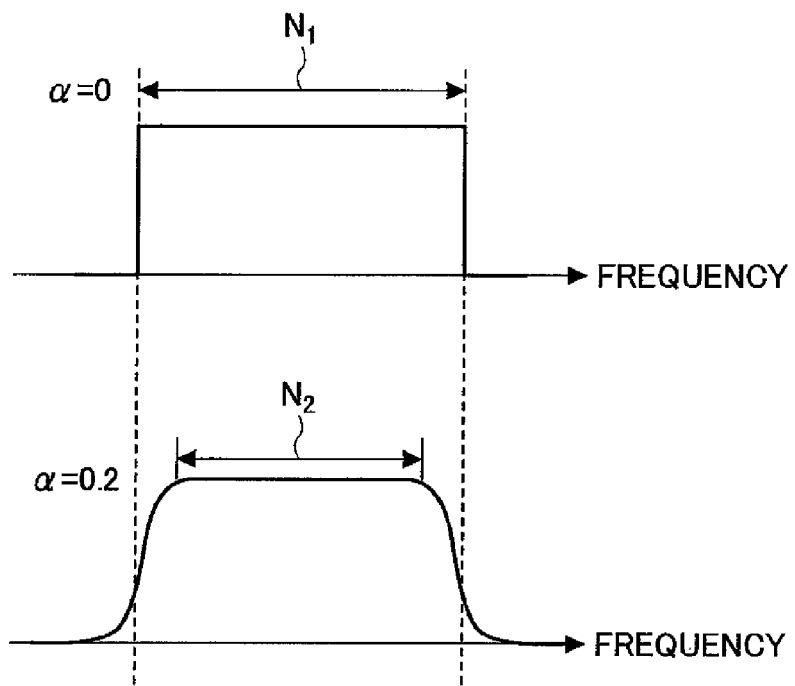
FIG. 2 is a diagram showing amplitude characteristics of a roll-off filter.

FIG. 2 shows amplitude characteristics of a roll-off filter that is a band limitation filter. The upper side of the figure shows amplitude characteristics when a roll-off factor or a roll-off coefficient $\alpha$ is 0, which corresponds to an ideal low-pass filter in which the passband and the stopband change steeply like a step at a boundary of the Nyquist frequency. The lower side of the figure shows amplitude characteristics when the roll-off factor $\alpha$ is 0.2. The roll-off factor $\alpha$ takes a value equal to or greater than 0 and equal to or less than 1. As shown in the figure, the section between a passband (a signal band before roll-off filter is applied) and a stopband gradually changes. Compared with the case of $\alpha=0$, in order to make the occupied band to be the same, it is necessary to set the passband $N_2$ to be narrower than the passband $N_1$. That is, it is necessary to set N2 such that relationship of $N1=N2\times(1+0.2)$ is satisfied. This tendency becomes remarkable as the roll-off factor becomes larger. In the following, relationship between various amounts and the roll-off factor is described.

(1) Relationship Between Data Amount and Roll-Off Factor

As shown in FIG. 2, the passband N becomes narrower as the roll-off factor $\alpha$ increases. From the viewpoint of transmitting larger amount of data, it is desirable that the passband is wide. Therefore, from the viewpoint of increasing the data transmission amount, it is desirable that roll-off factor $\alpha$ is small ($\alpha=0$ ideally).

(2) Relationship Between PAPR and Roll-Off Factor

As shown in FIG. 2, the smaller the roll-off factor $\alpha$ is, the more steeply the amplitude characteristics change between the passband and the stopband. This means that, when the roll-off factor is small, the side lobe component becomes large in amplitude characteristics in the time domain so that PAPR increases. Therefore, in view of suppressing PAPR to be small, it is desirable to set the roll-off factor large to make the change between the passband and the stopband to be smooth.

Figure 3:
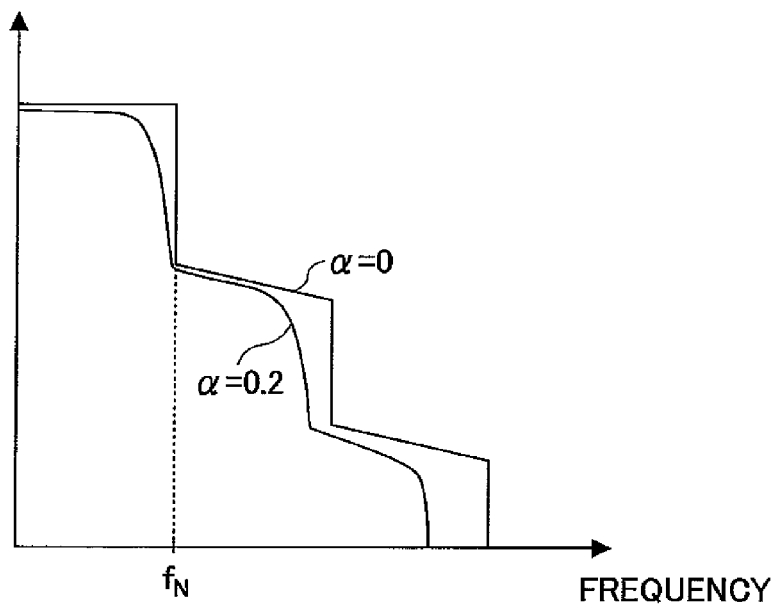
FIG. 3 is a diagram showing amplitude characteristics of a roll-off filter.

(3) Relationship Between Interference Exerted on Adjacent Bands and the Roll-Off Factor FIG. 2 shows an ideal filter amplitude characteristics in a range of the Nyquist frequency. However, in reality, as shown in FIG. 3, amplitude characteristic exceeding the Nyquist frequency $f_N$ cannot be neglected, and it becomes interference to be exerted on adjacent bands. In addition, there is a tendency that, the larger the Nyquist frequency $f_N$ is, the larger the interference exerted on adjacent bands is, and that the smaller the Nyquist frequency $f_N$ is, the smaller the interference exerted on adjacent bands is. As shown in FIG. 3, when occupied band fN after the roll-off filter is applied is the same, the smaller the roll-off factor is, the larger the interference is, and the larger the roll-off factor is, the smaller the interference is. Since the amplitude characteristics when $\alpha=0.2$ fall within a frequency region narrower than that of amplitude characteristics when $\alpha=0$, interference amount exerted on adjacent bands is also small. Therefore, from the viewpoint of decreasing interference exerted on adjacent bands, it is desirable to set the roll-off factor to be large.

(4) Relationship Between MCS and Roll-Off Factor

When AMC control is performed, radio transmission is performed with various bit rates according to channel states. The information bit rate is specified by a predetermined combination (to be also referred to as MCS number) of a modulation scheme and a channel coding rate. FIG. 4 shows combination examples of modulation schemes and channel coding rates. In the example shown in the figure, high speed information bit rates correspond to large MCS numbers and low speed information bit rates correspond to small MCS numbers. Generally, the channel state is represented by channel state information CQI. When the channel state is bad, a small MCS number is used so as to improve reliability of data transmission. On the other hand, when the channel state is good, a large MCS number is used so as to improve throughput of data transmission.

When the MCS number is large (when the number of modulation levels is large and/or when channel coding rate is large), since information bit rate is high, it is not useful to further urge high speed transmission by the band limitation filter. Rather, in this case, it is desirable to decrease interference exerted on other users and decrease PAPR. On the other hand, when MCS number is small (when the number of modulation levels is small and/or when channel coding rate is small), since the information bit rate is low, it is desirable to increase high throughput in the band limitation filter. Therefore, when the information bit rate is set to be high according to the AMC control, it is desirable to set the roll-off factor to be large.

In addition, when the information bit rate is set to be low according to the AMC control, it is desirable to set the roll-off factor to be small.

(5) Relationship Between Transmission Bandwidth and Roll-Off Factor

The mobile station performs communication using the whole or a part of the system frequency band. As described with reference to FIG. 3, the larger the Nyquist frequency $f_N$ is, the larger the interference exerted on adjacent bands is, and the smaller the Nyquist frequency $f_N$ is, the smaller the interference exerted on adjacent bands is. Therefore, a mobile station performing communication using a relatively narrow band (1.25 MHz in the whole 20 MHz, for example) does not exert so large interference on adjacent bands. On the other hand, a mobile station performing communication using a relatively wide band (10 MHz in the whole 20 MHz, for example) exerts large interference on adjacent bands. Therefore, when transmission bandwidth of the mobile station is narrow, it is desirable to set the roll-off factor to be small to increase data transmission amount. When the transmission bandwidth of the mobile station is wide, it is desirable to set the roll-off factor to be large to suppress interference exerted on adjacent bands.

In an embodiment of the present invention, given correspondence relationships among transmission bandwidth, MCS number and filter parameter are set according to the relationships of (1)-(5).

FIG. 5 shows the correspondence relationships as a table format. In the example shown in the figure, three MCSes are prepared for a transmission bandwidth BW1, and a proper roll-off factor $\alpha$ and a passbandwidth N are associated with each of the MCSes. Criteria for correspondence are the above-mentioned (1)-(5), and the table is prepared beforehand by using simulation and other methods. The number of MCSes prepared for each transmission bandwidth BW is not limited to three, and more or less of MCSes may be prepared. In addition, the table may be generated in consideration of transmission bandwidth and information of MCS used by simultaneously connecting users. In this example, although a roll-off factor and a number of subcarriers are set together, the number of subcarriers (occupied band after filtering) may be increased according to circumstances based on the transmission bandwidth and information of MCS used by the simultaneously connecting users (especially, when carrying out an embodiment as shown in FIG. 7).

The base station determines channel state of the uplink for each mobile station so as to determine radio parameters and filter parameters for each mobile station (for each scheduled mobile station) when assigning radio resources. The determined radio resource assignment content, radio parameters and filter parameters are reported to the mobile station using a control channel. The mobile station receives the control channel to perform data modulation and channel coding according to the reported radio parameters. The mobile station performs wave shaping for the signal that has been modulated and channel-coded. This band limitation is performed according to reported filter parameters. The signal after band limitation is transmitted to the base station using a bandwidth specified by the radio parameter. After that, when transmission of uplink is performed, similar procedure is repeated so that the radio parameters and the filter parameters are updated as necessary.

Figure 6:
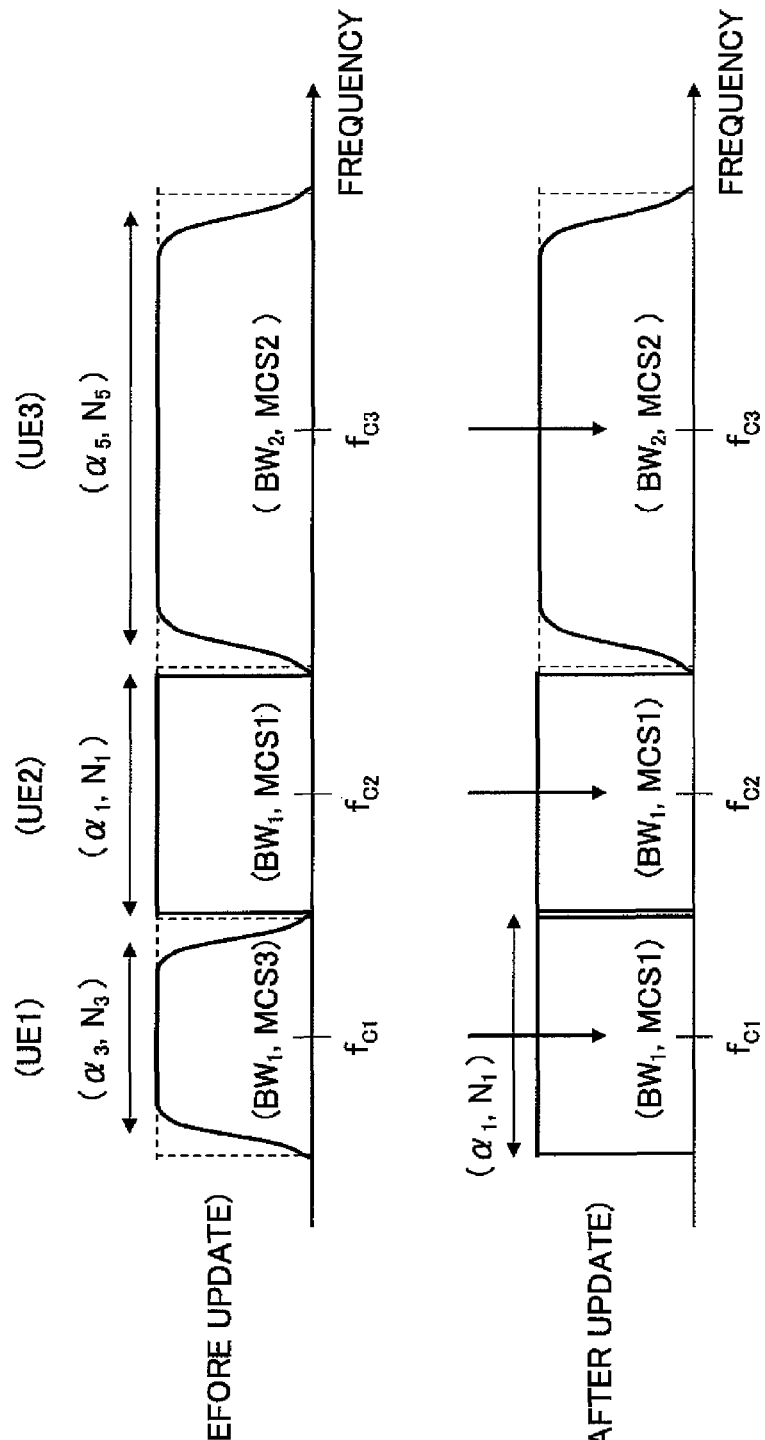
FIG. 6 is a diagram showing situations before and after update of radio parameters and filter parameters (center frequency unchanged)

FIG. 6 shows situations before and after update of the radio parameters and the filter parameters to be reported to each mobile station from the base station. At a time before update, radio parameters (BW1, MCS3) and filter parameters ($\alpha_3$, $N_3$) are reported to the mobile station UE1, and at a time after update, radio parameters (BW1, MCS1) and filter parameters ($\alpha_1$, $N_1$) are reported to the mobile station UE1. As a result, amplitude characteristics of the filter are largely changed. As to the second and the third mobile stations UE2 and UE3, the content of the parameters are not changed before and after the update. In the example shown in FIG. 6, when there is no change of the transmission bandwidth before and after update of the radio parameters and the filter parameters, the center frequencies $f_{c1}$, $f_{c2}$ and $f_{c3}$ are kept unchanged. Therefore, filter adjustment when updating parameters becomes easy.

Figure 7:
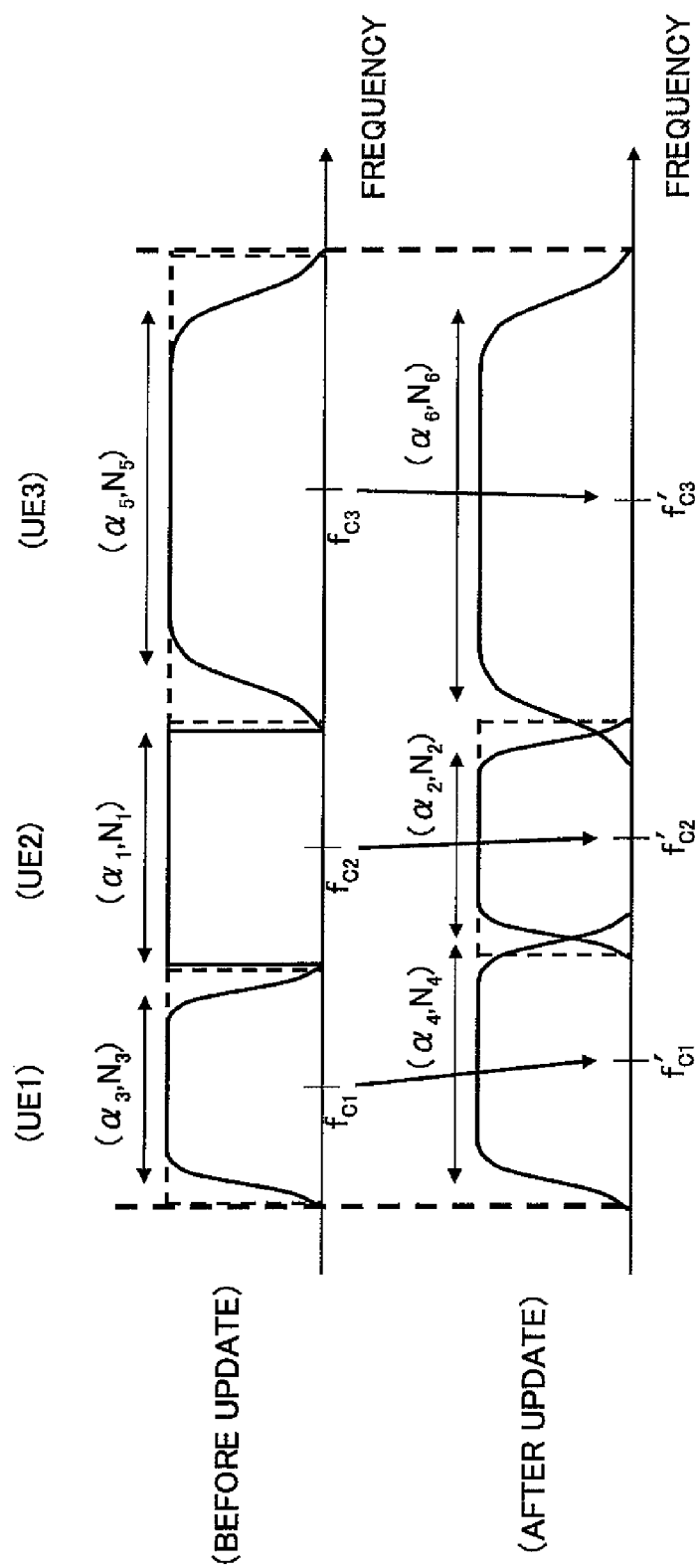
FIG. 7 is a diagram showing situations before and after update of radio parameters and filter parameters (center frequency changeable).

FIG. 7 also shows situations before and after update of the radio parameters and the filter parameters. At a time before update, filter parameters ($\alpha_3$, $N_3$) are reported to the first mobile station UE1. At a time after update, filter parameters ($\alpha_4$, $N_4$) are reported. As a result, amplitude characteristics of the filter are changed after the update. Although radio parameters may be also updated, radio parameters are not shown for the sake of simplicity of the figure. At a time before update, filter parameters ($\alpha_1$, $N_1$) are reported to the second mobile station UE2. At a time after update, filter parameters ($\alpha_2$, $N_2$) are reported. As a result, amplitude characteristics of the filter are changed after the update. At a time before update, filter parameters ($\alpha_5$, $N_5$) are reported to the third mobile station UE3. and, at a time after update, filter parameters ($\alpha_6$, $N_6$) are reported. As a result, amplitude characteristics of the filter are changed after update. In the example shown in FIG. 7, before and after the update of the radio parameters and the filter parameters, the center frequencies $f_{c1}$, $f_{c2}$ and $f_{c3}$ may be changed. Therefore, although filter adjustment when updating parameters becomes complicated by just that much, use efficiency of band can be increased.

As mentioned above, although preferred embodiments of the present invention are described, the present invention is not limited to those, and various variations and modifications may be made without departing from the scope of the present invention. For the sake of explanation, although the present invention is described by being divided to some embodiments, the division to each embodiment is not essential for the present invention, and equal to or greater than one embodiment may be used as necessary.

The present international application claims priority based on Japanese patent application No. 2006-077822, filed in the JPO on Mar. 20, 2006 and the entire contents of the Japanese patent application No. 2006-077822 is incorporated herein by reference.

The invention claimed is:

1. A base station used in a mobile communication system using a single carrier scheme in an uplink, comprising:
    a unit configured to perform communication with a mobile station that uses the whole or a part of a system frequency band;
    a storage unit configured to store correspondence relationship between radio parameters including a bandwidth, a modulation scheme and a channel coding rate of the uplink and filter parameters including at least a roll-off factor of a band limitation filter, wherein the radio parameters are associated with the filter parameters; and
    a determination unit configured to determine radio parameters and filter parameters for each mobile station based on the correspondence relationship according to channel state of the uplink;
    wherein the radio parameters and the filter parameters determined in the determination unit are reported to the mobile station.

2. The base station as claimed in claim 1, wherein the correspondence relationship associates a radio parameter of a higher bit rate with a larger roll-off factor.

3. The base station as claimed in claim 1, wherein the correspondence relationship associates a radio parameter of a lower bit rate with a smaller roll-off factor.

4. The base station as claimed in claim 1, wherein the correspondence relationship associates a wider bandwidth with a larger roll-off factor.

5. The base station as claimed in claim 1, wherein the correspondence relationship associates a narrower bandwidth with a smaller roll-off factor.

6. The base station as claimed in claim 1, wherein, in a case when assignment content of radio resources of the uplink is updated, when both or one of the modulation scheme and the channel coding rate is changed, a center frequency of the bandwidth is kept unchanged.

7. The base station as claimed in claim 1, in a case when assignment content of radio resources of the uplink is changed, when both or one of the modulation scheme and the channel coding rate is changed, change of a center frequency of the bandwidth is permitted.

8. A mobile station used in a mobile communication system using a single carrier scheme in an uplink, comprising:
a unit configured to perform communication with a base station using the whole or a part of a system frequency band
a storage unit configured to store corresponding relationship between radio parameters including a bandwidth, a modulation scheme and a channel coding rate of the uplink and filter parameters including at least a roll-off factor of a band limitation filter, wherein the radio parameters are associated with the filter parameters; and
a determination unit configured to determine radio parameters and filter parameters of the uplink based on a control signal from the base station and the correspondence relationship.

9. A method used in a base station of a mobile communication system using a single carrier scheme in an uplink, comprising:
storing correspondence relationship between radio parameters including a bandwidth, a modulation scheme and a channel coding rate of the uplink and filter parameters including at least a roll-off factor of a band limitation filter, wherein the radio parameters are associated with the filter parameters;
determining radio parameters and filter parameters for each mobile station based on the correspondence relationship according to channel state of the uplink; and
reporting the determined radio parameters and the filter parameters to a mobile station that uses the whole or a part of a system frequency band.

10. A method used in a mobile station of a mobile communication system using a single carrier scheme in an uplink, comprising:
storing correspondence relationship between radio parameters including a bandwidth, a modulation scheme and a channel coding rate of the uplink and filter parameters including at least a roll-off factor of a band limitation filter, wherein the radio parameters are associated with the filter parameters;
receiving a control signal from a base station;
determining radio parameters and filter parameters of the uplink based on the control signal and the correspondence relationship; and
transmitting a signal to the base station using the whole or a part of a system frequency band.

* * * * *